United States Patent [19]

Miyahara et al.

[11] Patent Number: 5,640,213
[45] Date of Patent: Jun. 17, 1997

[54] TELEVISION RECEIVER BEING DRIVEN BY EITHER ANALOG BROADCASTING SIGNALS OR DIGITAL BROADCASTING SIGNAL

[75] Inventors: Yasunori Miyahara; Yoshitomo Oumi; Syunichi Anzai, all of Kanagawa-ken; Atsumi Kuze, Kyoto-fu, all of Japan

[73] Assignee: Kabushiki Kaisha Toshiba, Kawasaki, Japan

[21] Appl. No.: 550,505

[22] Filed: Oct. 30, 1995

[30] Foreign Application Priority Data

Oct. 31, 1994 [JP] Japan ................................ 6-267439

[51] Int. Cl.[6] ................................................ H04N 1/00
[52] U.S. Cl. ........................... 348/726; 348/731; 348/6; 455/3.1; 455/6.1; 371/22.1; 371/68.1
[58] Field of Search ............................ 348/726, 731, 348/732, 10, 11, 6; 455/6.1, 3.1, 72, 189.1, 191.3, 192.3, 180.2, 179.1; 371/22.1, 30, 68.1; H04N 1/00

[56] References Cited

U.S. PATENT DOCUMENTS 4,573,153 2/1986 Nakamura et al. .................. 371/22
4,979,230 12/1990 Marz ................................. 455/3.1
5,293,633 3/1994 Robbins ............................ 455/3.1

FOREIGN PATENT DOCUMENTS 2-113608  4/1990  Japan .

*Primary Examiner*—Glenton B. Burgess
*Attorney, Agent, or Firm*—Cushman Darby & Cushman, IP Group of Pillsbury Madison & Sutro, L.L.P.

[57] ABSTRACT

A television receiver having an input section for splitting a reception signal to a first signal and a second signal, first and second mixers for respectively receiving the split reception signals, a local oscillator for outputting first and second local oscillation signals, a 90° phase shifter for providing the first local oscillation signal to another input of the first mixer after phase-shifting by 90°, a first output section for directly extracting outputs from the first and the second mixers, and a second output section for outputting a second output obtained by adding a direct output from the first mixer and the output from the second mixer which has passed through another 90° phase shifter.

8 Claims, 4 Drawing Sheets fR : DESIRED RECEPTION SIGNAL
fL : LOCAL OSCILLATION SIGNAL
fI : IMAGE FREQUENCY INTERFERENCE SIGNAL
fIF : DESIRED SECOND IF SIGNAL
fIM : IMAGE IF INTERFERENCE SIGNAL

TELEVISION RECEIVER BEING DRIVEN BY EITHER ANALOG BROADCASTING SIGNALS OR DIGITAL BROADCASTING SIGNAL

FIELD OF THE INVENTION

The present invention relates to a television receiver, and more particularly, to a television receiver which is capable of receiving both a digital broadcasting signal and an analog broadcasting signal, like in a CATV system.

BACKGROUND OF THE INVENTION

Generally, a conventional CATV receiver system applied within an analog broadcasting systems employs a double superheterodyne system to decrease an image frequency interference signal which is caused by a cross modulation. FIG. 4 shows in a block diagram a double superheterodyne system tuner circuit of the CATV receiver in the conventional analog broadcasting system. In FIG. 4, a numeral 41 denotes a tuner input section of the CATV receiver. A high-frequency reception signal of a desired channel is received through the input section 41 and selected by an up-converter 42. The selected signal is then converted to a higher frequency corresponding to a first intermediate frequency (IF) signal. The first IF signal is down-converted to a second IF signal having a fixed frequency through a mixing process performed by a mixer 43 using a local oscillation frequency provided by a local oscillator 44. The second IF signal is then led to an output section 45. The second IF signal is served as an IF signal of TV signals. An audio signal and a video signal for TV reception are extracted from the second IF signal through a demodulation process.

FIG. 5 is a block diagram showing a tuner circuit of the CATV receiver in a digital broadcasting system. Here, the digital broadcasting system will be exemplified by taking a multi-value QAM modulation system. In FIG. 5 a numeral 51 denotes a tuner input section of the CATV receiver. A high-frequency reception signal of a desired channel is received through the input section 51 and selected by an up-converter 52. The selected signal is then converted to a higher frequency first IF signal therein. The higher frequency first IF signal is split to two signals which are respectively applied as inputs to mixers 53 and 54. Additionally, one of two split oscillation signals that are output from a local oscillator 55 is phase-shifted by 90° through a 90° phase shifter 56 for a QAM detection and applied as an input to mixer 53. The other of the two split oscillation signals output from local oscillator 55 is applied as an output to the other input of the mixer 54 without being phase-shifted. The outputs of the mixers 53 and 54 will be obtained as an I signal and a Q signal, respectively. The I signal and the Q signal are detection signals of the multi-value QAM signal carried by the reception signal. The I signal and the Q signal are led to output sections 57 and 58, respectively. The I and Q signals are used for extracting the audio signal and the video signal in the TV reception through a multi-value PSK modulator and a digital modulator.

The above-described arrangement constitutes the conventional CATV receiver which is compatible to both the analog broadcasting and the digital broadcasting systems. However, in CATV systems, all broadcasting channels are not always transmitted by a fixed one of the digital broadcasting system and the analog broadcasting system. Rather, the analog broadcasting channels and the digital broadcasting channels are transmitted together in the CATV system. Therefore, convention CATV systems require a receiver which is compatible with both the analog broadcasting and the digital broadcasting. Such a receiver, which is compatible to both the analog and digital broadcastings, is realized by the present invention.

Returning again to FIG. 5, when a signal received through the input section 51 is the analog broadcasting signal, a desired channel of that high-frequency analog signal is processed by the up-converter 52 and the selected channel is converted to a higher frequency first IF signal. The higher frequency first IF signal is then split into two signals. When performing analog broadcasting reception, each of the two split signals may only be used for processing the TV signal. For example, here it is assumed that only the first IF signal applied to the mixer 54 will be utilized. For that reason, in case of analog broadcasting reception, the other mixer 53 and the 90° phase shifter 56 are not needed. Thus, during analog broadcasting reception, the first IF signal and the oscillation signal directly output from the local oscillator 55 are mixed in the mixer 54 and then converted to a second IF signal. The second IF signal is served as the IF signal of the TV signal which is to be used for extracting the audio signal and the video signal in the TV reception by demodulating the signal.

The above-described arrangement thus constitutes the CATV receiver compatible to both the analog broadcasting and the digital broadcasting systems by utilizing the digital broadcasting reception system as it is. However, in a CATV receiver arranged as mentioned above, image frequency interference signals have caused a problem, especially in the analog broadcasting reception.

The image frequency interference signal will be explained in reference to FIG. 6. In CATV receivers for the analog broadcasting, a desired reception signal fR and its image frequency interference signal fI, shown in FIG. 6, are received through the input terminal 51. The desired reception signal fR of the desired channel and the image frequency interference signal fI are selected by the up-converter 52. The channels are then converted to higher frequency first IF signals in the up-converter 52. The first IF signals having a fixed frequency are converted to second IF signals in the mixer 54 through a mixing operation with the local oscillation signal from the local oscillator 55. At this time, the image frequency interference signal fI applied to the mixer 54 results in an image IF interference signal fIM which corresponds to a differential frequency between the frequencies of the image frequency interference signal fI and the local oscillation signal fL on the output terminal 58. The image IF interference signal fIM in the output signal on the terminal 58 is then eliminated by a suitable filter for providing only the desired second IF signal fIF to a following stage for processing the second IF signal.

In this way, since the image IF interference signal fIM can not fall into the band of the local oscillation signal fL of the selected channel, such a surface wave TV system having channels spaced apart from each other with a relatively wide interval can eliminate the image IF interference signal fIM using a suitably designed filter which passes the local oscillation signal fL therethrough. However, in the case of the CATV broadcasting, as shown in FIG. 6, there is no space between the channel intervals different from those in the surface wave TV system. Since, in the local oscillation signal IF converted in frequency by the mixer 54, the image IF interference signal fIM falls into the band of the local oscillation signal fL of the selected channel when the reception signal is received, it is difficult to eliminate the image IF interference signal fIM using a filter for passing the local oscillation signal fL. Moreover, it is difficult for the conventional CATV tuner to vigorously depress the image IF interference signal fIM from cost and technical aspects. To provide a countermeasure against the persisting image IF interference signal fIM, a shield for tuners must be intensified. However, since it is impossible to eliminate the whole image IF interference signal fIM, the receiving performance has been deteriorated in the analog broadcasting reception state in the CATV receiver.

As described above, conventional CATV receivers have a drawback that is difficult in cost and technical aspects to fully eliminate image frequency interference signals which are generated in conjunction with a frequency conversion in the mixer.

SUMMARY OF THE INVENTION

It is therefore an object of the present invention to provide a television receiver compatible with an analog broadcasting reception and a digital broadcasting reception that is able to effectively eliminate image interference signals disturbing the analog broadcasting reception.

In order to achieve the above object, a television receiver according to one aspect of the present invention includes means for splitting a reception signal to a first signal and a second signal, first and second mixers for receiving the split reception signals from the splitting means to one of their inputs, a local oscillator for outputting first and second local oscillation signals, means for providing the first local oscillation signal to another input of the first mixer through a phase shifter which shifts the phase by 90°, first output means for directly extracting outputs from the first and the second mixers, and second output means for outputting a second output based on the sum of a direct output from the first mixer and the output from the second mixer which has passed through another 90° phase shifter.

According to the arrangement mentioned above, the mixer effectively eliminates the image IF interference signal when processing of the second IF signal. Therefore, the present invention is able to reduce signal deterioration caused by image frequency interference signals, which had caused troubles in the conventional CATV broadcasting receivers.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DESCRIPTION OF THE PREFERRED EMBODIMENTS

Embodiments of the television receiver according to the present invention will be explained hereinafter in reference to the attached drawings FIGS. 1, 2 and 3.

Figure 1:
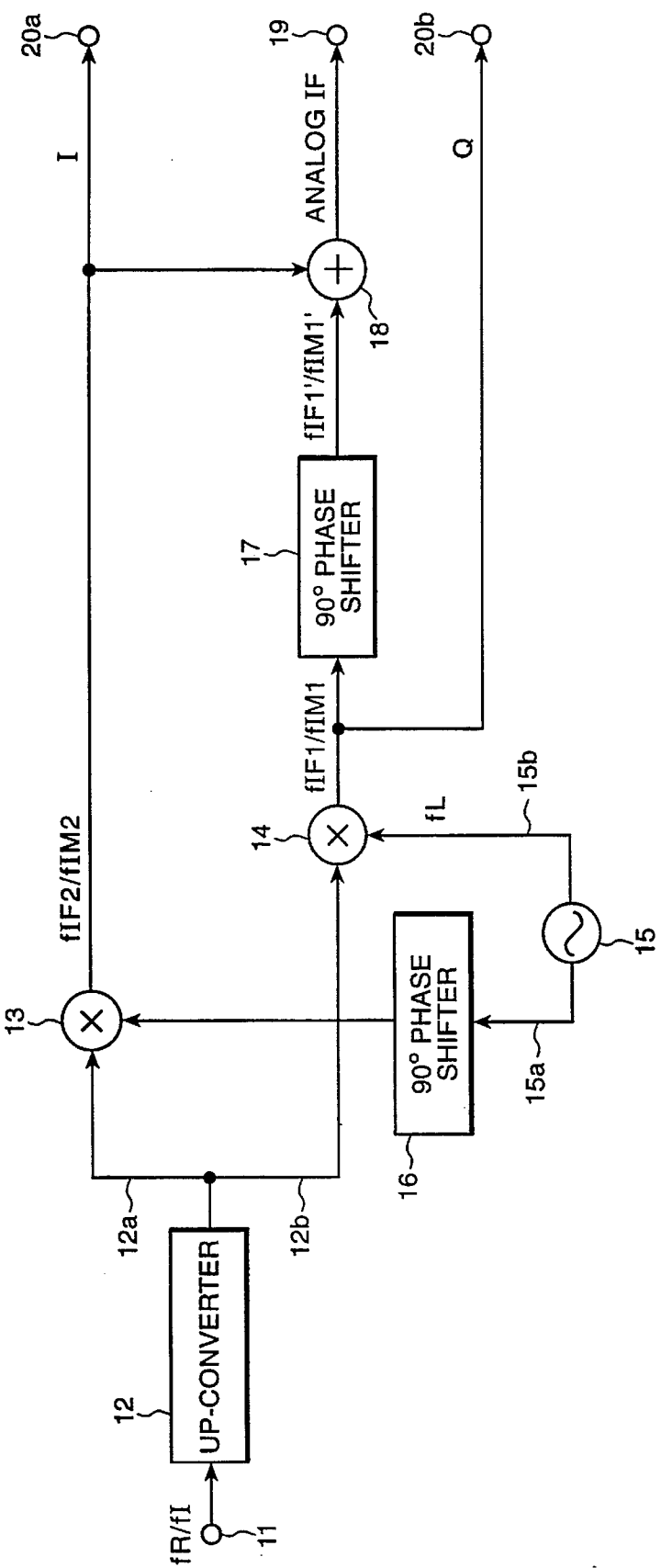
FIG. 1 is a block diagram showing one embodiment of the present invention.

FIG. 1 shows a block diagram illustrating an embodiment of the present invention. A high-frequency reception signal of a desired channel is received through a tuner input section 11 of a CATV receiver and is selected by an up-converter 12. The desired channel is then split to two first higher intermediate frequency (IF) signals 12a, 12b. These two first higher IF signals 12a, 12b are supplied to one of the inputs of mixers 13 and 14, respectively. Another input of mixer 13 is supplied with an oscillation signal 15a from a local oscillator 15 that has been passed through a 90° phase shifter 16. Another input of mixer 14 is supplied with another split oscillation signal 15b from local oscillator 15. The output of the mixer 14 is coupled to a 90° phase shifter 17. The output of the 90° phase shifter 17 is added with the output of the mixer 13 via an adder 18. Thus, the sum obtained in the adder 18 is output as an analog IF signal through an output terminal 19. Further, the output signals generated by the mixers 13 and 14 are led directly to output terminals 20a and 20b, respectively, as digital I and Q detection outputs.

In the digital broadcasting reception, the CATV tuner described above is configured the same as the conventional CATV tuner. However, it can easily eliminate the image frequency interference signal of the analog IF signal by placing an additional 90° phase shifter 17 in the IF signal path. The additional 90° phase shifter 17 can be the same as the 90° phase shifter 16. Further a cost problem arising the additional 90° phase shifter 17 will be overcome by fabricating the arrangement on IC chips.

Hereinafter, it will be explained how the image frequency interference signal of the analog IF signal led to the output terminal 19 can be eliminated in the analog broadcasting reception. An image frequency interference signal fI is received on input terminal 11 together with a desired reception signal fR. By using a phase shift type image suppressing mixer, an image IF interference signal fIM is reduced on the output terminal 19 for the reason explained below. Here, it is assumed that the desired reception signal fR is given by $\sin\omega Rt$, a local oscillation signal fL is given by $\sin\omega Lt$, an image frequency interference signal fI of the desired reception signal fR is given by $\sin\omega It$, and mixers are configured to work on conditions given by fL>fR and fI>fL. The mixer 14 outputs a differential frequency signal fIF1 between the desired reception signal fR and the local oscillation signal fL and also a differential frequency signal fIM1 between the image frequency interference signal fI and the local oscillation signal fL. The differential frequency signal fIF1 is thus expressed as follows:

$$fIF1 = \sin\omega Rt \times \sin\omega Lt \quad (1)$$
$$= -1/2 \times [\cos(\omega R + \omega L)t - \cos(\omega L - \omega R)t].$$

Considering only the differential frequency ΔfIF1 for utilizing the mixer as a down-converter, the differential frequency signal fIF1 is expressed as follows:

$$\Delta fIF1 = \tfrac{1}{2} \times \cos(\omega L - \omega R)t \quad (2).$$

The image frequency signal fIM1 of the output signal of the mixer 13 is expressed as follows:

$$fIM1 = \sin\omega I t \times \sin\omega L t \qquad (3)$$
$$= -1/2 \times [\cos(\omega I + \omega L)t - \cos(\omega I - \omega L)t].$$

The differential frequency ΔfIM1 of the image frequency signal fIM1 is expressed as follows:

$$\Delta fIM1 = \tfrac{1}{2}\times\cos(\omega I - \omega L)t \qquad (4).$$

The output of the mixer 14 is delayed by 90° through the 90° phase shifter 17. That is, the output signal of the 90° phase shifter 17 contains the delayed signal fIF1' and delayed image signal fIM1'. The signal fIF1' is expressed as follows:

$$fIF1' = \tfrac{1}{2}\times\cos(\omega L - \omega R + 90°) \qquad (5).$$

The image signal fIM1' is also expressed as follows:

$$fIM1' = \tfrac{1}{2}\times\cos(\omega I - \omega L + 90°) \qquad (6).$$

The mixer 13 outputs a signal fIF2 which is a multiple of the 90° delayed signal of the local oscillation signal fL and the first IF signal 12 and also an image signal fIM2. The signal fIF2 is expressed as follows:

$$fIF2 = \sin(\omega L t + 90°) \times \sin\omega R t \qquad (7)$$
$$= -1/2 \times [\cos(\omega L t + 90° + \omega R t) - \cos(\omega L t + 90° - \omega R t)].$$

The differential frequency ΔfIF2 of the signal fIF2 is expressed as follows:

$$\Delta fIF2 = \tfrac{1}{2}\times\cos(\omega L t + 90° - \omega R t) \qquad (8).$$

The image signal fIM2 is expressed as follows:

$$fIM2 = \sin\omega I t \times \sin(\omega L t + 90°) \qquad (9)$$
$$= -1/2 \times [\cos(\omega I t + \omega L t + 90°) - \cos(\omega I t - (\omega L t + 90°))].$$

The differential frequency ΔfIM2 of the image signal fIMF2 is also expressed as follows:

$$\Delta fIM2 = \tfrac{1}{2}\times\cos(\omega I t - \omega L t - 90°) \qquad (10).$$

The signal fIF led to the output terminal 19 becomes the sum of the output from the 90° phase shifter 17 and the output from the mixer 13, which is obtained by the adder 18. The signal fIF output from the adder 18 is thus expressed as follows:

$$\begin{aligned}fIF &= fIF1' = fIM1' + fIF2 + fIM2 \qquad (11)\\ &= 1/2 \times [\cos(\omega L t - \omega R t + 90°) + \cos(\omega I t - \omega L t + 90°) +\\ &\quad \cos(\omega L t - \omega R t + 90°) + \cos(\omega I t - \omega L t - 90°)]\\ &= \cos(\omega L t - \omega R t + 90°)\\ &= \cos(\omega I F t + 90°)\\ &= -\sin(\omega I F t).\end{aligned}$$

As seen from the equation (11), the image signals fIM1' and fIM2 are not present in the output at output terminal 19.

Figure 2:
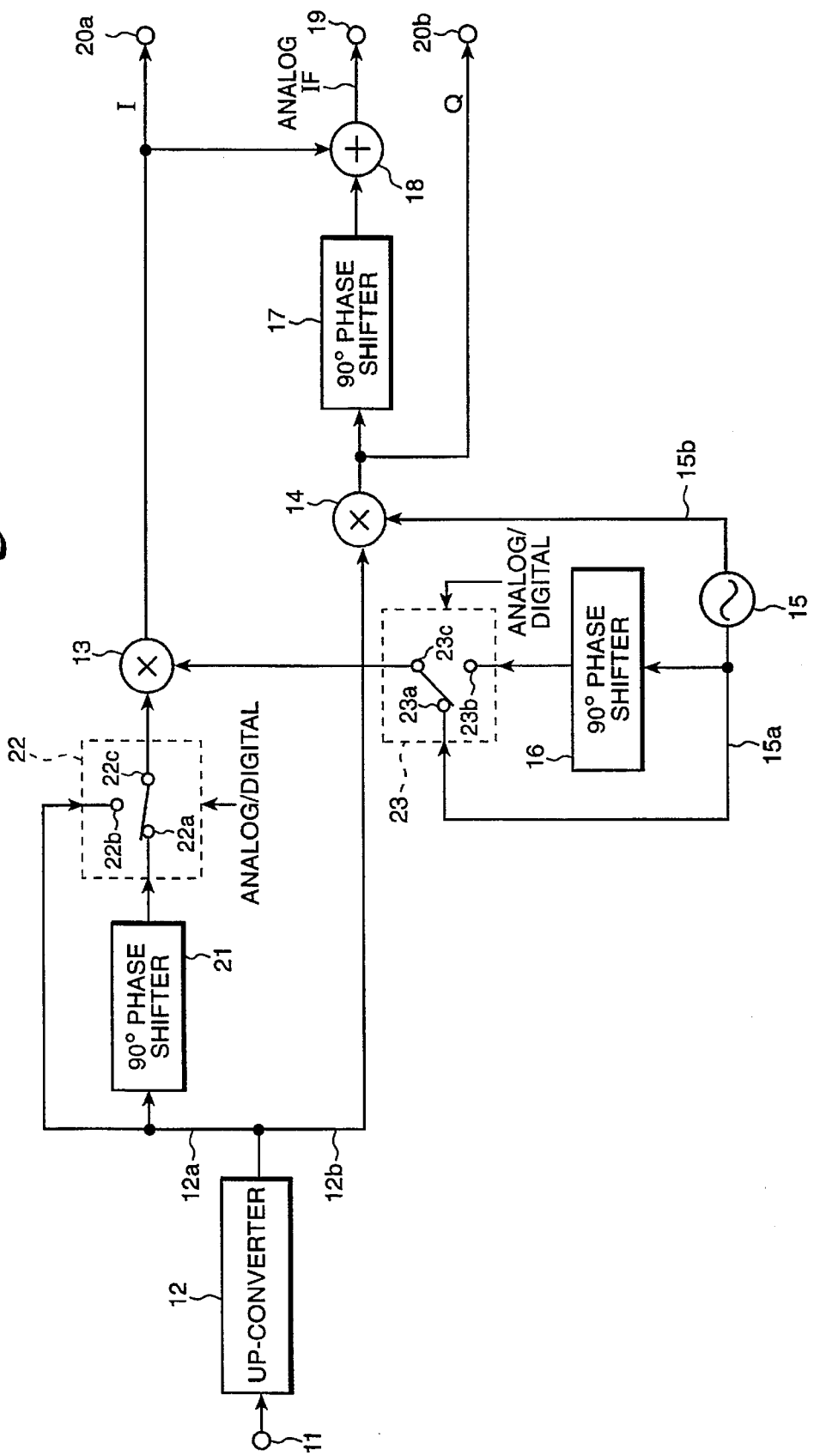
FIG. 2 is a block diagram showing another embodiment of the present invention.

FIG. 2 is a block diagram showing another embodiment of the present invention. In FIG. 2 the same components as those shown in FIG. 1 are assigned with the same reference numerals. A high-frequency reception signal of a desired channel is received through a tuner input section 11 of the CATV receiver and is selected by a up-converter 12. The desired signal is then split into two first higher intermediate frequency (IF) signals 12a, 12b. One of the first higher IF signal 12a is supplied to a first fixed contact 22a of a selector 22 through a first 90° phase shifter 21. This first higher IF signals 12a is also supplied directly to a second fixed contact 22b of the selector 22. The movable contact of the selector 22 is coupled to one input of a mixer 13. The other split first higher IF signal 12b is directly applied to one input of a mixer 14. One signal 15a of two split oscillation signals 15a, 15b from a local oscillator 15 is directly coupled to a first fixed contact 23a of another selector 23, while the same signal 15a is coupled to a second contact 23b of the selector 23 through a 90° phase shifter 16. The movable contact 23c of the selector 23 is coupled to another input of the mixer 13. The other split oscillation signal 15b from the local oscillator 15 is directly coupled to another input of the mixer 14.

The output of the mixer 14 is coupled to a 90° phase shifter 17. The output of the 90° phase shifter 17 is added with the output of the mixer 13 via an adder 18. Then the sum output from the adder 18 is led to an output terminal 19 for extracting analog IF signals. Both the outputs of the mixers 13 and 14 are directly led to output terminals 20a and 20b for extracting digital I and Q detection signals, respectively.

The selector 22 selects the output of the 90° phase shifter 21 when the movable contact 22c is switched to the first fixed contact 22a for an analog broadcasting reception. In contrast, for a digital broadcasting reception, the movable contact 22c is switched to the second fixed contact 22b to directly receive the first higher IF signal 12a from the up-converter 12. The selector 23 selects the direct path of the split oscillation signal 15 from the local oscillator 15 when the movable contact 23c is switched to the first fixed contact 22a for the analog broadcasting reception. In contrast, for a digital broadcasting reception, the movable contact 23c is switched to the second fixed contact 23b of the selector 23 to select the output of the 90° phase shifter 16.

The above embodiment is able to cheaply and easily remove image frequency interferences in the analog broadcasting reception. The only additional cost imposed is through the addition of the third 90° phase shifter 17 along the IF signal path because the arrangement of the embodiment for the digital broadcasting reception is like the conventional arrangement.

Figure 3:
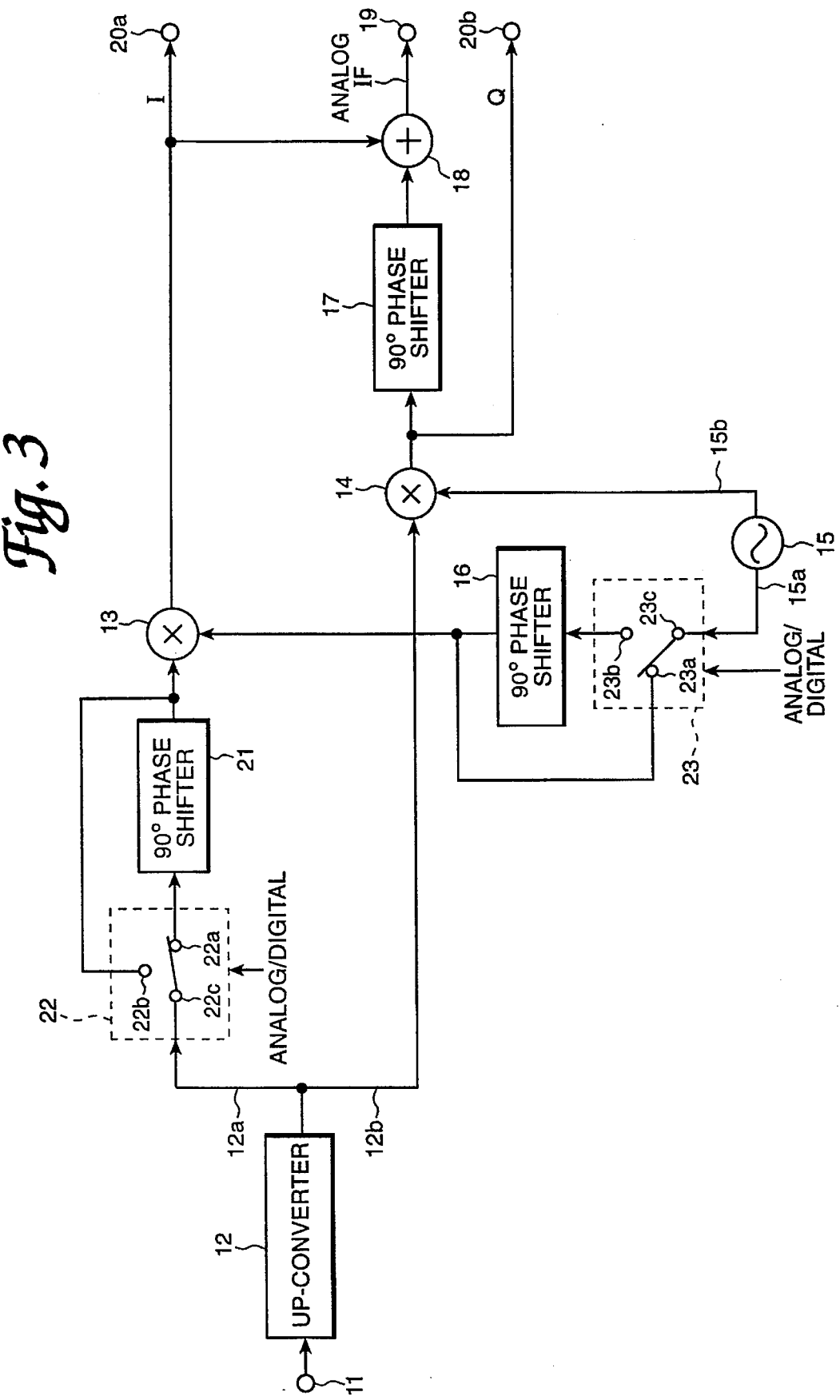
FIG. 3 is a block diagram showing still another embodiment of the present invention.
Figure 4:
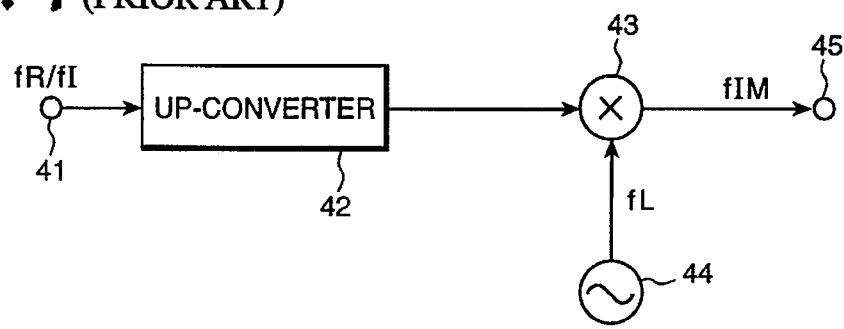
FIG. 4 is a block diagram showing a conventional analog broadcasting CATV receiver.
Figure 5:
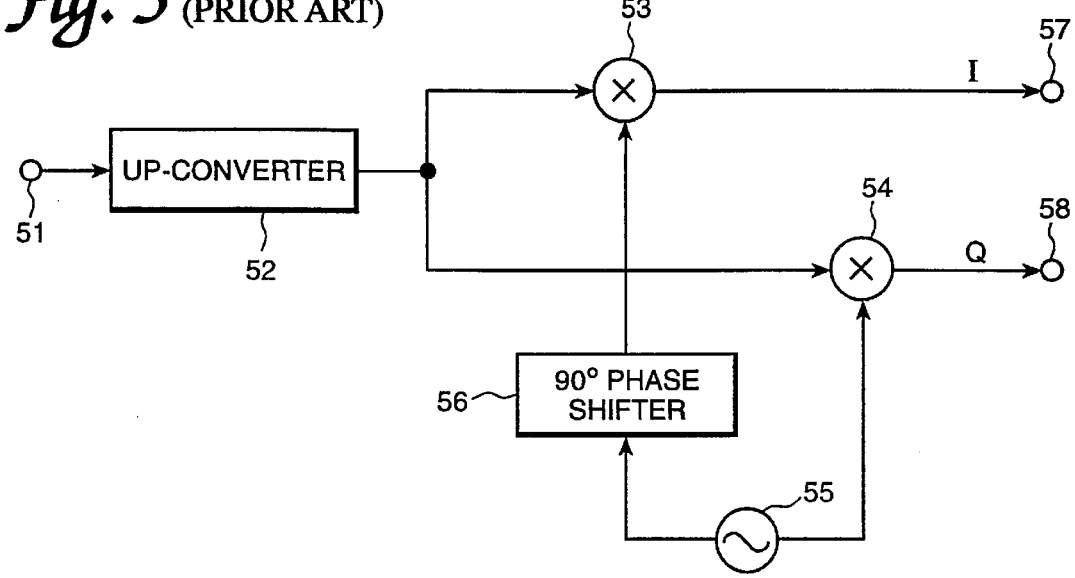
FIG. 5 is a block diagram showing a conventional digital broadcasting CATV receiver.
Figure 6:
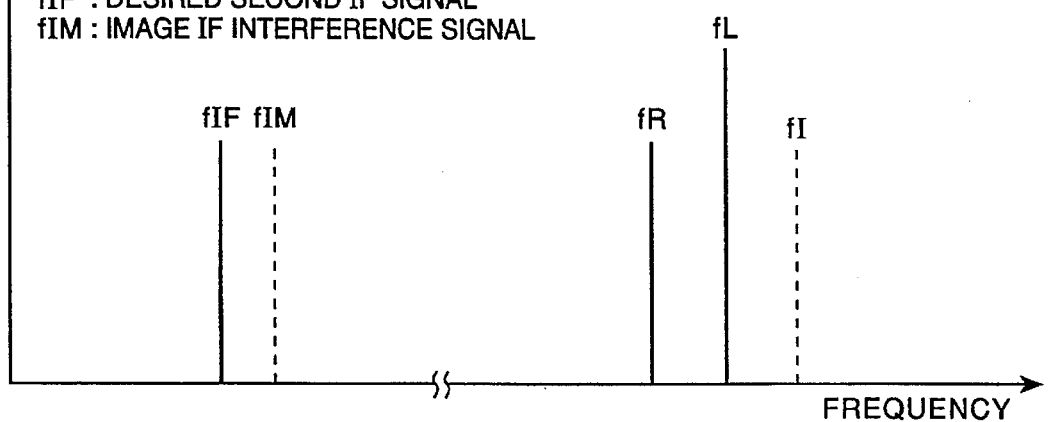
FIG. 6 is a frequency characteristics diagram for showing a distribution of image frequency interference components.

FIG. 3 is a block diagram illustrating still another embodiment of the present invention. This embodiment is different from the former embodiment, as shown in FIG. 2, in that the selectors 22 and 23 are located in front of the 90° phase shifters 21 and 16.

In the analog broadcasting reception the movable contact 22c of the selector 22 is switched to the fixed contact 22a, and the movable contact 23c of the selector 23 is switched to the fixed contact 22b. In the digital broadcasting reception the movable contact 22c of the selector 22 is switched to the fixed contact 22b, and the movable contact 23c of the selector 23 is switched to the fixed contact 23b. Accordingly, the selector 22 selects the output of the 90° phase shifter 21 during the analog broadcasting reception, while selecting the output signal 12a of the up-converter 12 during the digital broadcasting reception. The selector 23 selects the oscillation signal 15a of the local oscillator 15 during the analog broadcasting reception, while selecting the output of the 90° phase shifter 16 during the digital broadcasting reception.

Accordingly, the third embodiment of the present invention can also eliminate the image frequency interferences in the analog broadcasting reception in a manner similar to that explained for the second embodiment with respect to that shown in FIG. 2. Thus, the third embodiment is able to prevent the signal deterioration caused by the image frequency interference.

As described above, the present invention can provide an extremely preferable television receiver compatible with both the analog broadcasting reception and the digital broadcasting reception. One advantageous feature of the present invention is that it effectively eliminates the signal deterioration caused by the image frequency interference, which is troublesome in the analog broadcasting reception, by simply adding a 90° phase shifter along the analog IF signal path.

While there have been illustrated and described what are at present considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims. The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A television receiver comprising:

means for splitting a reception signal to a first signal and a second signal;

first and second mixers each having first and second inputs and each receiving a respective one of the split reception signals from the splitting means at the first input;

a local oscillator for outputting first and second local oscillation signals;

a first phase shifter shifting the phase of the first local oscillation signal;

means for providing the first local oscillation signal to the second input of the first mixer through the first phase shifter and for providing the second local oscillation signal directly to the second input of the second mixer;

first output means for directly extracting outputs from the first and the second mixers;

a second phase shifter shifting the phase of an output from the second mixer; and second output means for outputting a second output obtained by adding a direct output from the first mixer and an output from the second phase shifter.

2. The television receiver of claim 1, wherein the first output means is used as an output for a digital detection signal and the second output is used as an output for an analog IF detection signal.

3. A television receiver comprising:

means for splitting a reception signal to a first signal and a second signal;

a first mixer for receiving the first signal;

a first phase shifter for passing therethrough the second signal at a phase that is shifted when compared with the first signal;

a second mixer for receiving output from the first phase shifter;

a local oscillator for outputting first and second local oscillation signals, the first and second local oscillation signals being received by the first and second mixers, respectively;

a second phase shifter for passing therethrough an output of the first mixer at a phase shift;

first output means for directly extracting outputs from the first and the second mixers; and second output means for outputting a second output phase shifter and an output received directly from the second mixer.

4. The television receiver of claim 2, wherein the first output means is used as an output for a digital detection signal and the second output is used as an output for an analog IF detection signal.

5. A television receiver comprising:

means for splitting a reception signal to a first signal and a second signal;

a first selector for selecting a direct path for directly passing the first signal or an indirect path for passing the first signal via a first phase shifter;

a first mixer for receiving an output from the first selector;

a second mixer for receiving the second signal;

a local oscillator for outputting first and second local oscillation signals, the first and second local oscillation signals respectively being received by the first and second mixers;

a second selector for selecting a direct path for directly passing the first oscillation signal or an indirect path for passing the first oscillation signal via a second phase shifter;

means for applying the output of the second selector to the first mixer;

means for applying the second local oscillation signal to the second mixer;

first output means for directly extracting outputs from the first and the second mixers;

a third phase shifter for shifting a phase of an output from the second mixer; and second output means for outputting a second output obtained by adding an output received directly from the first mixer and an output of the third phase shifter, wherein the first selector selects the indirect path having the first phase shifter and the second selector selects the direct path directly passing the first local oscillation signal when the reception signal is an analog signal, and the first selector selects the direct path directly passing the first signal and the second selector selects the indirect path having the second phase shifter when the reception signal is a digital signal.

6. The television receiver of claim 5, wherein the first selector is located in front of the first phase shifter and the second selector is located in front of the second phase shifter.

7. The television receiver of claim 3, wherein the first output means is used as an output for a digital detection signal and the second output is used as an output for an analog IF detection signal.

8. The television receiver of claim 4, wherein the first output means is used as an output for a digital signal and the second output is used as an output for an analog IF detection signal.

* * * * *